(12) United States Patent
Lee et al.

(10) Patent No.: US 12,195,573 B2
(45) Date of Patent: Jan. 14, 2025

(54) MODIFIED CONJUGATED DIENE-BASED POLYMER, METHOD FOR PREPARING THE SAME AND RUBBER COMPOSITION COMPRISING THE SAME

(71) Applicant: LG Chem, Ltd., Seoul (KR)

(72) Inventors: Dong Gil Lee, Daejeon (KR); Soo Yong Lee, Daejeon (KR); Seung Ho Choi, Daejeon (KR); Won Mun Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 312 days.

(21) Appl. No.: 17/285,738

(22) PCT Filed: Jul. 13, 2020

(86) PCT No.: PCT/KR2020/009220
§ 371 (c)(1),
(2) Date: Apr. 15, 2021

(87) PCT Pub. No.: WO2021/010718
PCT Pub. Date: Jan. 21, 2021

(65) Prior Publication Data
US 2022/0127405 A1  Apr. 28, 2022

(30) Foreign Application Priority Data
Jul. 15, 2019 (KR) .................. 10-2019-0085173

(51) Int. Cl.
 C08K 3/04 (2006.01)
 C08F 297/02 (2006.01)

(52) U.S. Cl.
 CPC ............ C08F 297/026 (2013.01); C08K 3/04 (2013.01)

(58) Field of Classification Search
 CPC ..... C08F 236/06; C08F 236/04; C08F 220/60
 See application file for complete search history.

(56) References Cited

U.S. PATENT DOCUMENTS

| | | | |
|---|---|---|---|
| 5,128,416 A | 7/1992 | Imai et al. | |
| 8,613,298 B2 | 12/2013 | Kaszas | |
| 9,012,560 B2 | 4/2015 | Kunisawa et al. | |
| 9,790,359 B2 | 10/2017 | Imoto et al. | |
| 2005/0267288 A1 | 12/2005 | Yamaguchi et al. | |
| 2018/0030070 A1 | 2/2018 | Rossle et al. | |
| 2018/0030173 A1 | 2/2018 | Kang et al. | |
| 2018/0030174 A1 | 2/2018 | Kang et al. | |
| 2018/0037675 A1 | 2/2018 | Kang et al. | |
| 2018/0044452 A1 | 2/2018 | Kang et al. | |
| 2018/0223006 A1 | 8/2018 | Lee et al. | |
| 2018/0265644 A1 | 9/2018 | Schmidt et al. | |
| 2018/0312669 A1 | 11/2018 | Kang et al. | |
| 2018/0346616 A1 | 12/2018 | Oh et al. | |
| 2019/0263956 A1 | 8/2019 | Kim et al. | |
| 2019/0330448 A1 | 10/2019 | Kageyama et al. | |
| 2019/0367648 A1 | 12/2019 | Kang et al. | |
| 2020/0123289 A1 | 4/2020 | Kang et al. | |
| 2020/0148794 A1 | 5/2020 | Lee et al. | |
| 2020/0270378 A1 | 8/2020 | Kang et al. | |
| 2020/0308368 A1 | 10/2020 | Kim et al. | |

FOREIGN PATENT DOCUMENTS

| | | | |
|---|---|---|---|
| CN | 107531853 A | 1/2018 | |
| CN | 107614538 A | 1/2018 | |
| CN | 108368196 A | 8/2018 | |
| EP | 0341496 A2 | 11/1989 | |
| JP | S42018792 B | 9/1967 | |
| JP | H01217003 A | 8/1989 | |
| JP | H01284504 A | 11/1989 | |
| JP | H07070264 A | 3/1995 | |
| JP | 4807712 B2 * | 11/2011 | ............. C08F 36/04 |
| JP | 2012180408 A | 9/2012 | |
| JP | 2014051612 A | 3/2014 | |
| JP | 6299904 B1 | 3/2018 | |
| JP | 2018508638 A | 3/2018 | |
| JP | 2018510925 A | 4/2018 | |
| KR | 20050042131 A | 5/2005 | |
| KR | 20170000810 A | 1/2017 | |
| KR | 20170000811 A | 1/2017 | |
| KR | 20170082065 A | 7/2017 | |

(Continued)

OTHER PUBLICATIONS

JP4807712B2 English (Year: 2011).*

(Continued)

Primary Examiner — Catherine S Branch
Assistant Examiner — Huihong Qiao
(74) Attorney, Agent, or Firm — Lerner David LLP

(57) ABSTRACT

The present invention relates to a modified conjugated diene-based polymer having controlled degree of branching, excellent affinity with a filler, and excellent processability properties and compounding properties, a method for preparing the same, and a rubber composition including the same. The modified conjugated diene-based polymer is prepared using a modifier represented by Formula 1 to include a functional group derived from the modifier in at least one terminal of the polymer chain:

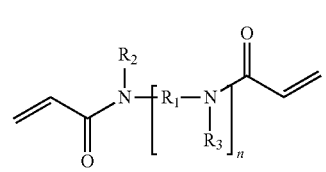

[Formula 1]

1—wherein $R_1$ to $R_3$ and n are described herein.

18 Claims, No Drawings

(56) References Cited

FOREIGN PATENT DOCUMENTS

| KR | 20170118794 A | | 10/2017 | | |
|---|---|---|---|---|---|
| KR | 20180058133 A | | 5/2018 | | |
| KR | 20190038287 A | | 4/2019 | | |
| KR | 20190044524 A | | 4/2019 | | |
| WO | WO96/21474 A1 | * | 7/1996 | ............ | C08F 236/04 |
| WO | 2015092466 A1 | | 6/2015 | | |
| WO | WO2017013138 A1 | * | 1/2017 | ............ | C08F 265/10 |
| WO | 2018128330 A1 | | 7/2018 | | |

OTHER PUBLICATIONS

Extended European Search Report for EP20841483 dated Nov. 12, 2021, 2 pgs.
International Search Report for Application No. PCT/KR2020/009220 dated Oct. 27, 2020, pp. 1-4.

* cited by examiner

MODIFIED CONJUGATED DIENE-BASED POLYMER, METHOD FOR PREPARING THE SAME AND RUBBER COMPOSITION COMPRISING THE SAME

CROSS-REFERENCE TO RELATED APPLICATIONS

The present application is a national phase entry under 35 U.S.C. § 371 of International Application No. PCT/KR2020/009220 filed Jul. 13, 2020, which claims the priority from Korean Patent Application No. 10-2019-0085173, filed Jul. 15, 2019, all of which are incorporated herein by reference.

TECHNICAL FIELD

The present invention relates to a modified conjugated diene-based polymer in which the degree of branching is controlled, affinity with a filler is excellent, and processability properties and compounding properties are excellent, a method for preparing the same and a rubber composition including the same.

BACKGROUND ART

Recently, according to the growing attention on energy saving and environmental issues, the decrease of the fuel consumption ratio of cars is required, and accordingly, a conjugated diene-based polymer having modulational stability represented by wet skid resistance as well as low rolling resistance, and excellent abrasion resistance and tensile properties is required as a rubber material for tires.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubber for tires.

In case of using the BR or SBR as the rubber material for tires, a filler including silica or carbon black is generally blended together and used to obtain the physical properties required for tires, but the affinity of the BR or SBR with the filler is not good, and there are problems in that the physical properties including abrasion resistance, crack resistance or processability are rather deteriorated.

As a method for improving the dispersibility of BR with an inorganic filler including silica or carbon black, a method of modifying a living active terminal with a specific coupling agent or a modifier has been suggested in a living polymer obtained by coordination polymerization using a catalyst composition including a lanthanide rare earth element compound. However, with the conventionally known catalyst including the lanthanide rare earth element compound, the activity of a living terminal thus produced is weak, a terminal modification ratio is low, and the improving effects of the physical properties of a rubber composition were insignificant.

[Prior Art Document] (Patent Document 1) KR 2005-0042131 A

DISCLOSURE OF THE INVENTION

Technical Problem

The present invention has been devised to solve the above-mentioned problems of the conventional technique, and an object of the present invention is to provide a modified conjugated diene-based polymer having controlled mooney viscosity and degree of branching, and improved compounding properties.

In addition, another object of the present invention is to provide a method for preparing a modified conjugated diene-based polymer using a modifier represented by Formula 1.

Also, another object of the present invention is to provide a rubber composition including the modified conjugated diene-based polymer.

Technical Solution

To solve the above-described tasks, the present invention provides a modified conjugated diene-based polymer including: a unit derived from a conjugated diene-based monomer; and a functional group derived from a modifier represented by the following Formula 1:

[Formula 1]

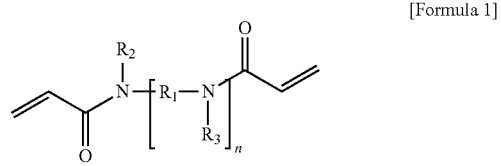

in Formula 1, $R_1$ is an alkylene group of 1 to 20 carbon atoms, an alkenylene group of 2 to 20 carbon atoms, an alkynylene group of 2 to 20 carbon atoms, a cycloalkylene group of 3 to 20 carbon atoms, an arylene group of 6 to 20 carbon atoms, a heteroalkylene group of 1 to 20 carbon atoms, a heteroalkenylene group of 2 to 20 carbon atoms, a heteroalkynylene group of 2 to 20 carbon atoms, a heterocycloalkylene group of 3 to 20 carbon atoms or a heteroarylene group of 3 to 20 carbon atoms, each of which is optionally substituted with a substituent, $R_2$ and $R_3$ are each independently an alkyl group of 1 to carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an aralkyl group of 7 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 3 to 20 carbon atoms, or a heteroaryl group of 3 to 20 carbon atoms, each of which is optionally substituted with the substituent, or $R_2$ and $R_3$ are connected with each other and together with $R_1$ and N to form a heterocyclic group of 3 to 20 carbon atoms, which is optionally substituted with the substituent, where the substituent is an alkyl group of 1 to 10 carbon atoms, an alkenyl group of 2 to 10 carbon atoms, an alkynyl group of 2 to 10 carbon atoms, a cycloalkyl group of 3 to 10 carbon atoms or an aryl group of 6 to 10 carbon atoms, and n is 0 or 1.

Also, the present invention provides a method for preparing the modified conjugated diene-based polymer, including: polymerizing a conjugated diene-based monomer in the presence of a neodymium catalyst composition in a hydrocarbon-based solvent to prepare an active polymer (step 1);

and reacting the active polymer with a modifier represented by the following Formula 1 (step 2):

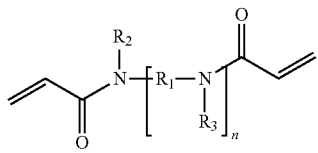

[Formula 1]

in Formula 1, $R_1$ to $R_3$, and n are the same as described above.

In addition, the present invention provides a rubber composition including the modified conjugated diene-based polymer and a filler.

Advantageous Effects

The modified conjugated diene-based polymer according to the present invention is prepared by using a modifier represented by Formula 1 and may control the degree of branching of a polymer chain and improve processability properties and abrasion resistance, and includes a functional group derived from the modifier in at least one terminal of the polymer chain and thus, has excellent affinity with a filler, thereby improving the compounding properties of a rubber composition including the same.

In addition, in the method for preparing the modified conjugated diene-based polymer according to the present invention, modification reaction is performed using a modifier represented by Formula 1, and a modified conjugated diene-based polymer having excellent processability properties and compound properties may be easily prepared.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Hereinafter, the terms and measurement methods used in the present invention may be defined as follows unless otherwise separately defined.

Terms

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality of substituents including two or more substituents may be present according to the number of hydrogen present in the functional group, the atomic group or the compound. In addition, if a plurality of substituents is present, each substituent may be the same or different.

The term "alkyl group" used in the present invention may mean monovalent aliphatic saturated hydrocarbon, and may include a linear alkyl group such as methyl, ethyl, propyl and butyl, and a branched alkyl group such as isopropyl, sec-butyl, tert-butyl and neo-pentyl.

The term "alkenyl group" used in the present invention may mean an alkyl group including one or two or more double bonds.

The term "alkynyl group" used in the present invention may mean an alkyl group including one or two or more triple bonds.

The term "alkylene group" used in the present invention may mean divalent aliphatic saturated hydrocarbon such as methylene, ethylene, propylene and butylene.

The term "alkenylene group" used in the present invention may mean an alkylene group including one or two or more double bonds.

The term "alkynylene group" used in the present invention may mean an alkylene group including one or two or more triple bonds.

The term "cycloalkyl group" in the present invention may mean cyclic saturated hydrocarbon.

The term "aryl group" used in the present invention may mean cyclic aromatic hydrocarbon, and may include both monocyclic aromatic hydrocarbon in which one ring is formed, or polycyclic aromatic hydrocarbon in which two or more rings are bonded.

The term "heteroalkyl group" used in the present invention may mean an alkyl group in which a carbon atom (excluding a terminal carbon atom) in the alkyl group is substituted with one or more heteroatoms, where the heteroatom may be selected from N, O and S.

The term "heteroalkenyl group" used in the present invention may mean an alkenyl group in which a carbon atom (excluding a terminal carbon atom) in the alkenyl group is substituted with one or more heteroatoms, where the heteroatom may be selected from N, O and S.

The term "heteroalkynyl group" used in the present invention may mean an alkynyl group in which a carbon atom (excluding a terminal carbon atom) in the alkynyl group is substituted with one or more heteroatoms, where the heteroatom may be selected from N, O and S.

The term "heterocycloalkyl group" used in the present invention may mean a cycloalkyl group in which a carbon atom (excluding a terminal carbon atom) in the cycloalkyl group is substituted with one or more heteroatoms, where the heteroatom may be selected from N, O and S.

The term "heteroaryl group" used in the present invention may mean an aryl group in which a carbon atom (excluding a terminal carbon atom) in the aryl group is substituted with one or more heteroatoms, where the heteroatom may be selected from N, O and S.

The term "heteroalkylene group" used in the present invention may mean an alkylene group in which a carbon atom (excluding a terminal carbon atom) in the alkylene group is substituted with one or more heteroatoms, where the heteroatom may be selected from N, O and S.

The term "heteroalkenylene group" used in the present invention may mean an alkenylene group in which a carbon atom (excluding a terminal carbon atom) in the alkenylene group is substituted with one or more heteroatoms, where the heteroatom may be selected from N, O and S.

The term "heteroalkynylene group" used in the present invention may mean an alkynylene group in which a carbon atom (excluding a terminal carbon atom) in the alkynylene group is substituted with one or more heteroatoms, where the heteroatom may be selected from N, O and S.

The term "heterocycloalkylene group" used in the present invention may mean a cycloalkylene group in which a carbon atom in the cycloalkylene group is substituted with one or more heteroatoms, where the heteroatom may be selected from N, O and S.

The term "heteroarylene group" used in the present invention may mean an arylene group in which a carbon atom in the arylene group is substituted with one or more heteroatoms, where the heteroatom may be selected from N, O and S.

The term "heterocyclic group" used in the present invention is cyclic saturated hydrocarbon or cyclic unsaturated hydrocarbon including one or more unsaturated bonds, in which a carbon atom in the hydrocarbon is substituted with one or more heteroatoms, where the heteroatom may be N.

The term "composition" used in the present invention may include a simple mixture of constituent components, diverse composites induced by physical or chemical attraction, or chemical reaction product of constituent components.

The terms "a unit derived from" and "a functional group derived from" used in the present invention may represent a component or a structure comes from a certain material, or the material itself.

[Measurement Methods]

In the present invention, "stress/relaxation (−S/R) value" represents a stress change shown in response to the same amount of strain, and is measured using MV2000E (Alpha Technologies Co.) at 100° C., at a rotor speed of 2±0.02 rpm using a large rotor. A polymer is stood at room temperature (23±5° C.) for 30 minutes or more, and 27±3 g of the polymer is collected and put in a die cavity, and then, a platen is operated, and mooney viscosity is measured while applying torque. The −S/R value is obtained by measuring the gradient value of the mooney viscosity change appearing during releasing the torque and representing as an absolute value.

In the present invention, "mooney viscosity (MV)" is a measure judging the processability of a polymer, and if the mooney viscosity is low to an appropriate level, it could be judged that flowability is good and processability is excellent. The unit is represented by Mooney Unit (MU), a ML (1+4) value is obtained at 100° C., where M represents Mooney, L represents a plate size, 1 represents 1 minute which is preheating time, and 4 represents reading a value after 4 minutes from rotor operation.

Particularly, the mooney viscosity was measured while applying torque after standing a polymer at room temperature (23±5° C.) for 30 minutes or more, collecting 27±3 g of the polymer and putting in a die cavity, and then, operating platen by using MV2000E (Alpha Technologies Co.) and using Large Rotor at 100° C. at a rotor speed of 2±0.02 rpm.

In the present invention, "molecular weight distribution (MWD, Mw/Mn)" represents the degree of the molecular weight distribution of a polymer and is calculated from a ratio (Mw/Mn) of a weight average molecular weight (Mw) to a number average molecular weight (Mn) of a polymer. The weight average molecular weight and the number average molecular weight were measured after dissolving a polymer in tetrahydrofuran (THF) for 2 hours or more under 40° C. conditions and using gel permeation chromatography (GPC). In this case, two columns of PLgel Olexis™ and one column of PLgel MIXED-C™ (trade names of Polymer Laboratories Co.) were used in combination, and newly replaced columns were all mixed bed type columns, and polystyrene was used as a GPC standard material.

In the present invention, the "cis-1,4 bond content" and the "vinyl bond content" are measured through Fourier-transform infrared spectroscopy (FT-IR), and obtained by, for example, measuring FT-IR transmittance spectrum of the carbon disulfide solution of a conjugated diene-based polymer that is prepared at a concentration of 5 mg/ml with carbon disulfide of the same cell as a blank, and using the maximum peak value around 1130 cm$^{-1}$ (a, base line), the minimum peak value around 967 cm$^{-1}$ (b) showing a trans-1,4 bond, the minimum peak value around 911 cm$^{-1}$ (c) showing a vinyl bond, and the minimum peak value around 736 cm$^{-1}$ (d) showing a cis-1,4 bond of the measured spectrum.

The present invention provides a modified conjugated diene-based polymer having controlled mooney viscosity and degree of branching, excellent processability properties and abrasion resistance, and excellent affinity with a filler, and thus, having excellent compounding properties such as tensile properties and viscoelasticity properties.

The modified conjugated diene-based polymer according to an embodiment of the present invention is prepared by modification reaction using a modifier represented by Formula 1, as in the preparation method described later, and the mooney viscosity and degree of branching may be controlled. In addition, since a functional group derived from the modifier is included in the polymer, compounding properties may be improved.

Particularly, the modified conjugated diene-based polymer according to an embodiment of the present invention is characterized in including: a unit derived from a conjugated diene-based monomer; and a functional group derived from a modifier represented by Formula 1 below.

[Formula 1]

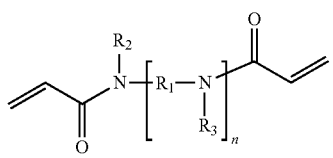

In Formula 1, $R_1$ is an alkylene group of 1 to 20 carbon atoms, an alkenylene group of 2 to 20 carbon atoms, an alkynylene group of 2 to 20 carbon atoms, a cycloalkylene group of 3 to 20 carbon atoms, an arylene group of 6 to 20 carbon atoms, a heteroalkylene group of 1 to 20 carbon atoms, a heteroalkenylene group of 2 to 20 carbon atoms, a heteroalkynylene group of 2 to 20 carbon atoms, a heterocycloalkylene group of 3 to 20 carbon atoms or a heteroarylene group of 3 to 20 carbon atoms, each of which is optionally substituted with a substituent, $R_2$ and $R_3$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an aralkyl group of 7 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 3 to 20 carbon atoms, or a heteroaryl group of 3 to 20 carbon atoms, each of which is optionally substituted with the substituent, or $R_2$ and $R_3$ are connected with each other, and together with $R_1$ and N to form a heterocyclic group of 3 to 20 carbon atoms, which is optionally substituted with the substituent, where the substituent is an alkyl group of 1 to 10 carbon atoms, an alkenyl group of 2 to 10 carbon atoms, an alkynyl group of 2 to 10 carbon atoms, a cycloalkyl group of 3 to 10 carbon atoms or an aryl group of 6 to 10 carbon atoms, and n is 0 or 1.

In addition, in an embodiment of the present invention, the modified conjugated diene-based polymer may include: a unit derived from a conjugated diene-based monomer; and a functional group derived from a modifier, and the functional group derived from the modifier may be bonded to at least one terminal of a polymer chain composed of the unit derived from a conjugated diene-based monomer.

The modifier represented by Formula 1 according to an embodiment of the present invention includes a tertiary amine derivative, and in a conjugated diene-based polymer, particularly, a conjugated diene-based polymer having an active organometal part, a functional group may be provided to the conjugated diene-based polymer through substitution or addition reaction with the active organometal part, thereby modifying the conjugated diene-based polymer.

Meanwhile, the modifier according to an embodiment of the present invention includes a functional group which may increase the affinity with a filler in a molecule, and the compounding properties between the polymer and the filler may be improved, and further, by including a tertiary amine derivative as described above, agglomeration among filler particles in a rubber composition may be prevented, and the dispersibility of the filler may be improved. For example, if silica which is a type of an inorganic filler, is used as the filler, agglomeration may be easily generated due to hydrogen bonding among hydroxyl groups present at the surface of the silica, but the tertiary amine group may inhibit the hydrogen bonding among the hydroxyl groups of the silica and improve the dispersibility of the silica. Like this, since the modifier has a structure which may maximize the compounding properties of the modified conjugated diene-based polymer, a modified conjugated diene-based polymer serving a rubber composition having excellent balance between mechanical properties such as abrasion resistance and processability may be prepared.

Particularly, in Formula 1, $R_1$ is an alkylene group of 1 to 20 carbon atoms, an alkenylene group of 2 to 20 carbon atoms, an alkynylene group of 2 to 20 carbon atoms, a cycloalkylene group of 3 to 20 carbon atoms, an arylene group of 6 to 20 carbon atoms, a heteroalkylene group of 1 to 20 carbon atoms, a heteroalkenylene group of 2 to 20 carbon atoms, a heteroalkynylene group of 2 to 20 carbon atoms, a heterocycloalkylene group of 3 to 20 carbon atoms or a heteroarylene group of 3 to 20 carbon atoms, each of which is optionally substituted with a substituent, $R_2$ and $R_3$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an aralkyl group of 7 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 3 to 20 carbon atoms, or a heteroaryl group of 3 to 20 carbon atoms, each of which is optionally substituted with a substituent, or $R_2$ and $R_3$ are connected with each other, and together with $R_1$ and N to form a heterocyclic group of 3 to 20 carbon atoms, which is optionally substituted with a substituent, where the substituent is an alkyl group of 1 to 10 carbon atoms, an alkenyl group of 2 to 10 carbon atoms, an alkynyl group of 2 to 10 carbon atoms, a cycloalkyl group of 3 to 10 carbon atoms or an aryl group of 6 to 10 carbon atoms, and n is 0 or 1. If n is 0, $R_1$ and $R_3$ are not present, and thus, a heterocyclic group formed by connecting $R_2$ and $R_3$ together with $R_1$ and N is not present.

More particularly, in Formula 1, n is 1, and in this case, $R_1$ may be an alkylene group of 1 to 10 carbon atoms, an alkenylene group of 2 to 10 carbon atoms, an alkynylene group of 2 to 10 carbon atoms, a heteroalkylene group of 1 to 10 carbon atoms, a heteroalkenylene group of 2 to 10 carbon atoms, a heteroalkynylene group of 2 to 10 carbon atoms, a heterocycloalkylene group of 3 to 10 carbon atoms or a heteroarylene group of 3 to 10 carbon atoms, each of which is optionally substituted with a substituent, $R_2$ and $R_3$ may be each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to carbon atoms, a heteroalkynyl group of 2 to 10 carbon atoms, a heterocycloalkyl group of 3 to 10 carbon atoms, or a heteroaryl group of 6 to 10 carbon atoms, each of which is optionally substituted with a substituent, or $R_2$ and $R_3$ may be connected with each other, and together with $R_1$ and N to form a heterocyclic group of 3 to 10 carbon atoms, which is optionally substituted with a substituent. Here, the substituent may be an alkyl group of 1 to 6 carbon atoms, an alkenyl group of 2 to 6 carbon atoms, an alkynyl group of 2 to 6 carbon atoms, a cycloalkyl group of 3 to 6 carbon atoms or an aryl group of 6 to 8 carbon atoms.

In another embodiment, in Formula 1, n is 0, and in this case, $R_1$ and $R_3$ are not present, and $R_2$ may be an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, an aralkyl group of 7 to 10 carbon atoms, a heteroalkyl group of 1 to 10 carbon atoms, a heteroalkenyl group of 2 to 10 carbon atoms, a heteroalkynyl group of 2 to carbon atoms, a heterocycloalkyl group of 3 to 10 carbon atoms, or a heteroaryl group of 6 to 10 carbon atoms, each of which is optionally substituted with a substituent. Here, the substituent may be an alkyl group of 1 to 6 carbon atoms, an alkenyl group of 2 to 6 carbon atoms, an alkynyl group of 2 to 6 carbon atoms, a cycloalkyl group of 3 to 6 carbon atoms or an aryl group of 6 to 8 carbon atoms.

More particularly, the modifier represented by Formula 1 above may be selected from the compounds represented by Formula 1-1, Formula 1-2 or Formula 1-3 below.

[Formula 1-1]

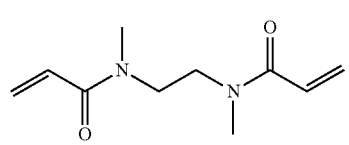

[Formula 1-2]

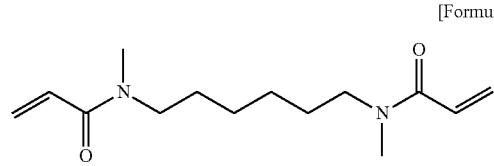

-continued

[Formula 1-3]

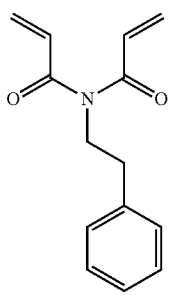

In another embodiment, the modifier represented by Formula 1 may be a compound represented by Formula 2 below.

[Formula 2]

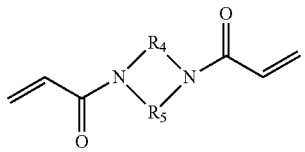

In Formula 2, $R_4$ and $R_5$ are each independently an alkylene group of 1 to 3 carbon atoms, an alkenylene group of 2 to 4 carbon atoms or an alkynylene group of 2 to 4 carbon atoms, each of which is optionally substituted with a substituent, wherein the substituent may be an alkyl group of 1 to 3 carbon atoms, an alkenyl group of 2 to 4 carbon atoms, an alkynyl group of 2 to 4 carbon atoms, a cycloalkyl group of 3 to 6 carbon atoms or an aryl group of 6 to 10 carbon atoms.

More particularly, the compound represented by Formula 2 may be a compound represented by Formula 2-1 below.

[Formula 2-1]

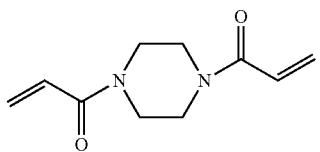

In addition, the modified conjugated diene-based polymer according to an embodiment may have a −S/R value measured at 100° C. of 0.5 or less, and a mooney viscosity of 40 or more.

Particularly, the modified conjugated diene-based polymer may have a −S/R value measured at 100° C. of 0.2 to 0.5, and a mooney viscosity of 40 to 80. If the modified conjugated diene-based polymer has the −S/R value and mooney viscosity, compounding properties with a filler, for example, carbon black may be excellent, and mechanical properties may be excellent, and thus, the processability properties of a rubber composition including the same may be improved, and at the same time, abrasion resistance may be improved.

Meanwhile, in the present invention, the compounding properties represent the easiness of compounding (mixing) among components in a mixture including various components, and particularly, in a rubber composition, the compounding properties may mean the easiness of compounding among components included in the rubber composition, for example, between rubber and a filler.

The −S/R (stress/relaxation) represents the stress change shown in response to the same amount of strain generated in a material, and through the −S/R, the degree of branching of a modified conjugated diene-based polymer may be anticipated. For example, if the −S/R value is low, it means that the degree of branching is high. In addition, the numerical value represents an absolute value.

Meanwhile, if the −S/R value is too low, that is, if the degree of branching is too high, if applied to a rubber composition, processability may be improved, but defects of increasing rotation resistance and decreasing mechanical properties may arise.

However, the modified conjugated diene-based polymer according to an embodiment of the present invention has the −S/R value and mooney viscosity in the above-described ranges, and if applied to a rubber composition, both effects of compounding properties such as tensile properties and viscoelasticity and compounding processability may be excellent.

In addition, the molecular weight distribution of the modified conjugated diene-based polymer may be 1.5 to 10.0, particularly, 2.0 to 6.0, more particularly, 2.5 to 5.0 or 2.5 to 4.5.

In the present invention, the molecular weight distribution of the modified conjugated diene-based polymer may be calculated from the ratio (Mw/Mn) of the weight average molecular weight (Mw) to the number average molecular weight (Mn). In this case, the number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents the molecular weight distribution a polymer composition. All average molecular weights may be represented by g/mol. In addition, each of the weight average molecular weight and the number average molecular weight may mean a polystyrene conversion molecular weight analyzed by gel permeation chromatography (GPC).

The modified conjugated diene-based polymer according to an embodiment of the present invention may satisfy the molecular weight distribution conditions and at the same time, have the weight average molecular weight (Mw) of $3 \times 10^5$ to $1.5 \times 10^6$ g/mol, and the number average molecular weight (Mn) of $1.0 \times 10^5$ to $5.0 \times 10^5$ g/mol, and within these ranges, if applied to a rubber composition, tensile properties are excellent, processability is excellent, the workability of a rubber composition is improved, mulling and kneading are easy, and effects of excellent mechanical properties and balance of physical properties of a rubber composition may be achieved. The weight average molecular weight may be, for example, $5 \times 10^5$ to $1.2 \times 10^6$ g/mol, or $5 \times 10^5$ to $8 \times 10^5$ g/mol, and the number average molecular weight may be, for example, $1.5 \times 10^5$ to $3.5 \times 10^5$ g/mol, or $2.0 \times 10^5$ to $2.7 \times 10^5$ g/mol.

More particularly, if the modified conjugated diene-based polymer according to an embodiment of the present invention satisfies the weight average molecular weight (Mw) and the number average molecular weight conditions together with the molecular weight distribution, and if applied to a rubber composition, tensile properties, viscoelasticity and processability of the rubber composition are excellent, and balance among them is excellent.

In addition, the conjugated diene-based polymer may have the cis-1,4 bond content of a conjugated diene part measured by Fourier-transform infrared spectroscopy (FT-IR) of 95 wt % or more, more particularly, 96 wt % or more. Accordingly, if applied to a rubber composition, the abrasion resistance, crack resistance and ozone resistance of the rubber composition may be improved.

In addition, the modified conjugated diene-based polymer may have the vinyl content of a conjugated diene part measured by Fourier-transform infrared spectroscopy (FT-IR) of 5 wt % or less, more particularly, 2 wt % or less, more particularly, 1 wt % or less. If the vinyl content in the polymer is greater than 5 wt %, the abrasion resistance, crack resistance and ozone resistance of the rubber composition including the same may be deteriorated.

In addition, the modified conjugated diene-based polymer according to an embodiment of the present invention may be a neodymium catalyzed modified conjugated diene-based polymer. Particularly, the modified conjugated diene-based polymer may be a conjugated diene-based polymer including an organometal part which is activated from a catalyst composition including a neodymium compound.

In addition, the present invention provides a method for preparing the modified conjugated diene-based polymer.

The method for preparing the modified conjugated diene-based polymer according to an embodiment of the present invention is characterized in including: polymerizing a conjugated diene-based monomer in the presence of a neodymium catalyst composition in a hydrocarbon-based solvent to prepare an active polymer (step 1); and reacting the active polymer with a modifier represented by Formula 1 below (step 2).

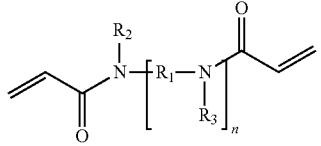

[Formula 1]

In Formula 1, $R_1$ to $R_3$ and n are the same as described above.

Step 1 is a polymerization step of polymerizing a conjugated diene-based monomer for preparing an active polymer including an organometal part, and may be performed in a hydrocarbon-based solvent in the presence of a neodymium catalyst composition.

In the present invention, in the active polymer including the organometal part, the organometal part may be an activated organometal part at the terminal of a conjugated diene-based polymer chain formed from the conjugated diene-based monomer (activated organometal part at the terminal of a molecular chain), an activated organometal part in the chain, or an activated organometal part in a side chain (branched chain), and among them, in case of obtaining the activated organometal part by anionic polymerization or coordination anionic polymerization, the organometal part may represent an activated organometal part at the terminal.

The conjugated diene-based monomer may include 1,3-butadiene, or derivatives thereof such as 1,3-butadiene, 2,3-dimethyl-1,3-butadiene, and 2-ethyl-1,3-butadiene, and other conjugated diene-based monomer which is copolymerizable with the 1,3-butadienes including 2-methyl-1,3-pentadiene, 1,3-pentadiene, 3-methyl-1,3-pentadiene, 4-methyl-1,3-pentadiene, 1,3-hexadiene or 2,4-hexadiene, and compounds of any one or two or more thereof may be used.

In addition, in case of using 1,3-butadiene and other conjugated diene-based monomers together as the conjugated diene-based monomer, the ratio may be controlled so that the conjugated diene-based polymer thus prepared includes the repeating unit derived from 1,3-butadiene monomer in 80 to 100 wt %.

In addition, the hydrocarbon-based solvent is not specifically limited, but may be linear, branched or cyclic aliphatic hydrocarbon of 5 to 20 carbon atoms such as n-pentane, n-hexane, n-heptane, n-octane, n-nonane, n-decane, isopentane, isohexane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or aromatic hydrocarbon such as benzene, toluene, ethylbenzene, and xylene, and mixtures of any one or two or more thereof may be used. More particularly, a nonpolar solvent may be the linear, branched or cyclic aliphatic hydrocarbon of 5 to 20 carbon atoms or the mixture solvent of aliphatic hydrocarbon, more particularly, n-hexane, cyclohexane or a mixture thereof.

In addition, the neodymium catalyst composition may include a neodymium compound, an alkylating agent and a halogen compound, and the neodymium compound may be a compound represented by Formula 3 below.

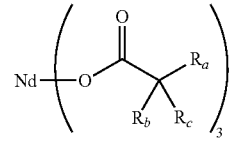

[Formula 3]

In Formula 3, $R_a$ to $R_c$ are each independently hydrogen, or an alkyl group of 1 to 12 carbon atoms, where $R_a$ to $R_c$ are not hydrogen at the same time.

Hereinafter, the catalyst composition will be explained in particular for each component.

Neodymium Compound

The neodymium compound may be a neodymium compound of Formula 3 where $R_a$ is a linear or branched alkyl group of 6 to 12 carbon atoms, and $R_b$ and $R_c$ are each independently a hydrogen atom or an alkyl group of 2 to 6 carbon atoms, where $R_b$ and $R_c$ are not hydrogen atoms at the same time, more particularly, a neodymium compound of Formula 3 where $R_a$ is a linear or branched alkyl group of 6 to 8 carbon atoms, and $R_b$ and $R_c$ are each independently an alkyl group of 2 to 6 carbon atoms.

As described above, if the neodymium compound of Formula 3 includes a carboxylate ligand including alkyl groups of 2 or more carbon atoms having diverse lengths as substituents at a position, steric change is induced around a neodymium central metal to block flocculation phenomenon among compounds, and as a result, oligomerization is restrained, and a conversion ratio into an active species is high. Such a neodymium compound has high solubility in a polymerization solvent.

More particularly, the neodymium compound may be any one or mixtures of two or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)

₃, Nd(2-propyl-2-hexyl decanoate)₃, Nd(2-propyl-2-isopropyl decanoate)₃, Nd(2-butyl-2-hexyl decanoate)₃, Nd(2-hexyl-2-octyl decanoate)₃, Nd(2,2-diethyl octanoate)₃, Nd(2,2-dipropyl octanoate)₃, Nd (2,2-dibutyl octanoate)₃, Nd (2,2-dihexyl octanoate)₃, Nd(2-ethyl-2-propyl octanoate)₃, Nd(2-ethyl-2-hexyl octanoate)₃, Nd(2,2-diethyl nonanoate)₃, Nd(2,2-dipropyl nonanoate)₃, Nd(2,2-dibutyl nonanoate)₃, Nd(2,2-dihexyl nonanoate)₃, Nd(2-ethyl-2-propyl nonanoate)₃ and Nd(2-ethyl-2-hexyl nonanoate)₃. In addition, considering excellent solubility in a polymerization solvent without fear of oligomerization, a conversion ratio into a catalyst active species, and consequent excellent improving effects of catalyst activity, the neodymium compound may be any one or mixtures of two or more selected from the group consisting of Nd(2,2-diethyl decanoate)₃, Nd(2,2-dipropyl decanoate)₃, Nd(2,2-dibutyl decanoate)₃, Nd(2,2-dihexyl decanoate)₃, and Nd(2,2-dioctyl decanoate)₃.

In addition, the neodymium compound may have a solubility of about 4 g or more per 6 g of a non-polar solvent at room temperature (23±5° C.). In the present invention, the solubility of the neodymium compound means the degree of clear dissolution without generating turbid phenomenon. Through such high solubility, excellent catalyst activity may be attained.

Alkylating Agent

The alkylating agent is an organometal compound which is capable of transporting a hydrocarbyl group to another metal, and may act as a co-catalyst, and any one may be used without specific limitation only if used as an alkylating agent during preparing a conjugated diene-based polymer.

Particularly, the alkylating agent is soluble in a nonpolar solvent, particularly, a nonpolar hydrocarbon-based solvent, and may be an organometal compound including a bond of cationic metal such as metals in group 1, group 2 or group 3 and carbon or a boron-containing compound. More particularly, the alkylating agent may be any one selected from the group consisting of an organoaluminum compound, an organomagnesium compound and an organolithium compound, or mixtures of two or more thereof.

The organoaluminum compound may be one or more selected from the group consisting of: alkylaluminum such as trimethylaluminum, triethylaluminum, tri-n-propylaluminum, triisopropylaluminum, tri-n-butylaluminum, tri-isobutylaluminum, tri-t-butylaluminum, tripentylaluminum, trihexylaluminum, tricyclohexylaluminum, and trioctylaluminum; dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; and hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride.

The organomagnesium compound may be, for example, an alkylmagnesium compound such as diethylmagnesium, di-n-propylmagnesium, diisopropylmagnesium, dibutylmagnesium, dihexylmagnesium, diphenylmagnesium, and dibenzylmagnesium.

The organolithium compound may be, for example, an alkyllithium compound such as n-butyllithium.

The alkylating agent may use, for example, one or more selected from the group consisting of the organoaluminum compound, the organomagnesium compound, and the organolithium compound. Particularly, diisobutylaluminum hydride (DIBAH) which may play the role of a molecular weight controlling agent during polymerization reaction may be used. In another embodiment, the alkylating agent may be used in 1 to 100 mol, or 3 to 20 mol based on 1 mol of the neodymium compound.

Halogen Compound

The type of the halogen compound is not specifically limited, but any one commonly used as a halogenating agent during preparing a conjugated diene-based polymer may be used, without specific limitation.

For example, one or more selected from the group consisting of an aluminum halogen compound; an inorganic halogen compound obtained by substituting aluminum with boron, silicon, tin or titanium in the aluminum halogen compound; and an organohalogen compound such as t-alkylhalogen compound (alkyl of 4 to 20 carbon atoms), may be used.

Particularly, the inorganic halogen compound may be one or more selected from the group consisting of dimethylaluminum chloride, diethylaluminum chloride (DEAC), dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-butyltin dichloride, di-butyltin dibromide, tri-butyltin chloride, and tri-butyltin bromide.

In another embodiment, the organohalogen compound may be one or more selected from the group consisting of t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate and methyl bromoformate.

The halogen compound may use, for example, one or more selected from the group consisting of the inorganic halogen compound and the organohalogen compound, and in another example, may be used in 1 to 20 mol, 1 to 5 mol, or 2 to 3 mol based on 1 mol of the neodymium compound.

In another embodiment, as the alkylating agent and the halogen compound, a neodymium compound alkylated and chlorinated in advance may be included, and in this case, effects of even further increasing a modification ratio may be achieved.

According to an embodiment of the present invention, the catalyst composition may further include a conjugated diene-based monomer used in this polymerization reaction.

As described above, if a portion of the conjugated diene-based monomer used in this polymerization reaction is premixed with the catalyst composition and used in a preforming catalyst composition type, effects of improving catalyst activity and stabilizing the conjugated diene-based polymer thus prepared may be achieved.

In the present invention, the "preforming" may mean pre-polymerization in a catalyst system by the addition of butadiene, in case where diisobutylaluminum hydride (DIBAH), etc. is included in a catalyst composition including a neodymium compound, an alkylating agent and a halogen compound, i.e., a catalyst system, and a small amount of a conjugated diene-based monomer such as butadiene is added to reduce the production possibility of various catalyst species therewith. In addition, the "premix" may mean a homogenously mixed state of each of compounds without being polymerized in a catalyst system.

In a particular embodiment, the conjugated diene-based monomer may be one or more selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene. The conjugated diene-based monomer used for preparing the catalyst composition may be a partial amount within the total amount range of the conjugated diene-based monomer used for the polymerization reaction, particularly, 1 to 100 mol, 10 to 50 mol, or 20 to mol based on 1 mol of the neodymium compound.

The aforementioned catalyst composition may be prepared, for example, by injecting and mixing the neodymium compound, alkylating agent, halogen compound, and selectively a conjugated diene-based monomer in order in a hydrocarbon-based solvent. In this case, the hydrocarbon-based solvent may be a nonpolar solvent which has no reactivity with the constituent components of the catalyst composition. Particularly, the hydrocarbon-based solvent may be linear, branched or cyclic aliphatic hydrocarbon of 5 to 20 carbon atoms such as n-pentane, n-hexane, n-heptane, n-octane, n-nonane, n-decane, isopentane, isohexane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or aromatic hydrocarbon-based solvent such as benzene, toluene, ethylbenzene, and xylene, and mixtures of any one or two or more thereof may be used. More particularly, the nonpolar solvent may be the linear, branched or cyclic aliphatic hydrocarbon of 5 to 20 carbon atoms or the mixture solvent of aliphatic hydrocarbon, more particularly, n-hexane, cyclohexane or a mixture thereof.

The polymerization of step 1 may be performed by radical polymerization and in a particular embodiment, may be performed by bulk polymerization, solution polymerization, suspension polymerization or emulsion polymerization, more particularly, solution polymerization. In another embodiment, the polymerization reaction may be performed by any method among a batch type method and a continuous type method. In a particular embodiment, the polymerization reaction for preparing the conjugated diene-based polymer may be performed by injecting a conjugated diene-based monomer to the catalyst composition and reacting in an organic solvent.

In another embodiment, the polymerization may be performed in a hydrocarbon-based solvent. The hydrocarbon-based solvent may be additionally added to the amount of the hydrocarbon-based solvent which may be used for preparing the catalyst composition. In this case, the hydrocarbon-based solvent may be the same as described above. Also, in case where the hydrocarbon-based solvent is used, the concentration of the monomer may be 3 to 80 wt %, or 10 to 30 wt %.

According to an embodiment of the present invention, during the polymerization reaction for preparing the active polymer, additives such as a reaction quenching agent for finishing polymerization reaction such as polyoxyethylene glycol phosphate; and an antioxidant such as 2,6-di-t-butylparacresol, may be further used. In addition, additives generally serving easy solution polymerization, particularly, additives such as a chelating agent, a dispersant, a pH controlling agent, a deoxidizer, and an oxygen scavenger may be used.

In another embodiment, the polymerization reaction for preparing the active polymer may be performed at a temperature of 20 to 200° C., or 20 to 100° C. for 15 minutes to 3 hours, or 30 minutes to 2 hours. Within the ranges, reaction control may be easy, polymerization reaction rate and efficiency may be excellent, and the cis-1,4 bond content of the active polymer thus prepared may be high. In addition, in the polymerization reaction, preferably, the mixing of a compound having deactivating action such as oxygen, water and carbonic acid gas in a polymerization reaction system may be prevented so as not to deactivate the catalyst composition and a polymer including the neodymium compound.

As a result of such polymerization reaction, an active polymer including an organometal part activated from the catalyst composition including the neodymium compound, more particularly, a conjugated diene-based polymer catalyzed with neodymium including a 1,3-butadiene monomer unit may be produced, and the conjugated diene-based polymer thus prepared may have pseudo-living properties.

Step 2 is a modification reaction step of reacting the active polymer with a modifier for preparing a modified conjugated diene-based polymer including a functional group derived from the modifier, and may be performed by reacting the active polymer with the modifier represented by Formula 1.

Meanwhile, in an embodiment of the present invention, the modifier may be used in a stoichiometric quantity or more with respect to the active organometal part of the active polymer, particularly, in 0.1 to 20 mol, or 0.5 to 10 mol based on 1 mol of the neodymium compound in the neodymium catalyst composition.

In addition, the modification reaction may be performed by solution reaction or solid phase reaction, particularly, by solution reaction. In another embodiment, the modification reaction may be performed using a batch type reactor, or by a continuous type using an apparatus such as a multi-step continuous reactor and an inline mixer.

In another embodiment, the modification reaction may be performed under the same temperature and pressure conditions as a common polymerization reaction, in a particular embodiment, may be performed at a temperature of 20 to 100° C.

After finishing the modification reaction, 2,6-di-t-butyl-p-cresol (BHT), an isopropanol solution, etc. may be added to a polymerization reaction system to quench the polymerization reaction.

In addition, the present invention provides a rubber composition including the modified conjugated diene-based polymer, and a molded article manufactured from the rubber composition.

The rubber composition according to an embodiment of the present invention is characterized in including a modified conjugated diene-based polymer and a filler, and satisfying Mathematical Formula 1 below.

$$-15 \leq X-Y \leq 20 \qquad \text{[Mathematical Formula 1]}$$

In Mathematical Formula 1,

X is a mooney viscosity of the rubber composition measured at 100° C., and Y is a mooney viscosity of the modified conjugated diene-based polymer measured at 100° C.

In the present invention, Mathematical Formula 1 represents mooney viscosity difference between a modified conjugated diene-based polymer and a rubber composition including the same, and it means that if the difference decreases, the processability of the rubber composition becomes excellent.

Since the rubber composition according to an embodiment of the present invention satisfies Mathematical Formula 1 by including the modified conjugated diene-based polymer having the aforementioned characteristics, processability properties may be excellent.

Here, the mooney viscosity of the rubber composition may be measured through the above-described measurement method of the mooney viscosity of the rubber composition including a modified conjugated diene-based polymer and a filler, and in another embodiment, for example, a vulcanization compounding as shown in Experimental Example 2 which will be explained later, including a modified conjugated diene-based polymer, a filler and other additives, may be prepared and the mooney viscosity may be measured through the measurement method of mooney viscosity.

In addition, the rubber composition may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, the improving effects of the abrasion resistance and crack resistance of a molded article, for example, a tire manufactured using the rubber composition may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based copolymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acrylic rubber, a urethane rubber, a silicone rubber, an epichlorohydrin rubber and a halogenated butyl rubber, and any one or mixtures of two or more thereof may be used.

In addition, the rubber composition may include 0.1 parts by weight to 150 parts by weight of a filler with respect to 100 parts by weight of the modified conjugated diene-based polymer, and the filler may be a silica-based filler, carbon black or combinations thereof. Particularly, the filler may be a carbon black-based filler, and here, the carbon black-based filler may be carbon black.

The carbon black-based filler is not specifically limited but may be one having a nitrogen adsorption specific surface area of, for example, 20 $m^2$/g to 250 $m^2$/g (measured based on $N_2$SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2$/g, the processability of the rubber composition may be deteriorated, and if the nitrogen adsorption specific surface area of the carbon black is less than 20 $m^2$/g, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica-based filler is not specifically limited, but may include, for example, wet silica (hydrated silicate), dry silica (anhydrous silicate), calcium silicate, aluminum silicate or colloid silica. Particularly, the silica-based filler may be wet silica which has the most remarkable compatibility effect of the improving effect of destruction characteristics and wet grip. In addition, the silica may have nitrogen absorption specific surface area (nitrogen surface area per gram, $N_2$SA) of 120 $m^2$/g to 180 $m^2$/g, and cetyl trimethyl ammonium bromide (CTAB) absorption specific surface area of 100 $m^2$/g to 200 $m^2$/g. If the nitrogen absorption specific surface area of the silica is less than 120 $m^2$/g, the reinforcing performance due to silica may be deteriorated, and if the nitrogen absorption specific surface area of the silica is greater than 180 $m^2$/g, the processability of the rubber composition may be deteriorated. In addition, if the CTAB absorption specific surface area of the silica is less than 100 $m^2$/g, the reinforcing performance by the silica filler may be deteriorated, and if the CTAB absorption specific surface area of the silica is greater than 200 $m^2$/g, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis (3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N, N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. More particularly, the silane coupling agent may be bis (3-triethoxysilylpropyl)polysulfide or 3-trimethoxysilylpropylbenzothiazyltetrasulfide in consideration of the improving effects of reinforcing properties.

In addition, the rubber composition according to an embodiment of the present invention may be sulfur crosslinkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded article manufactured using the rubber composition may include tires or tire treads.

In addition, the molded article may have, if measured according to ASTM D412, the tensile strength of 160 $kgf/cm^2$ to 210 $kgf/cm^2$, 300% modulus of 90 $kgf/cm^2$ to 110 $kgf/cm^2$, and a 60° C. Tan δ value at a frequency of 10 Hz and dynamic modification ratio of 3% of 0.170 or less.

Hereinafter, the present invention will be explained in particular referring to embodiments. However, the embodiments below are only for illustrating the present invention, and the scope of the present invention is not limited thereto.

Example 1

Under nitrogen conditions, 0.38 mmol of neodymium versatate (NdV), 3.7 mmol of diisobutylaluminum hydride (DIBAH), 0.96 mmol of diethylaluminum chloride and 13.2 mmol of 1,3-butadiene were added to hexane and mixed to prepare a catalyst composition.

To a completely dried 10 L, steel reactor, under a nitrogen atmosphere, 2.7 kg of hexane and 300 g of 1,3-butadiene were injected, and while stirring at 300 rpm, the temperature was elevated to 60° C. The catalyst composition was injected thereto, and polymerization reaction was performed for 60 minutes to prepare a butadiene polymer solution including an activated aluminum part at a terminal. In this case, the conversion ratio of 1,3-butadiene to polybutadiene was about 100%, and a portion was taken from the polymerization solution and used for measuring the mooney viscosity and degree of branching of a polymer before modification.

To the polymer solution, toluene in which 1.9 mmol of a compound represented by Formula 2-1 below was dissolved was added as a modifier, and modification reaction was performed at 60° C. for 30 minutes. 0.2 parts by weight of hexane in which polyoxyethylene glycol phosphate was dissolved as a polymerization quencher (based on 100 parts by weight of a polymer in the reactor) and 0.5 parts by weight of 2,6-di-t-butyl-p-cresol (based on 100 parts by weight of a polymer in the reactor) as an antioxidant were added thereto, and the reaction was finished. Then, solvents were removed through steam stripping, and drying was performed using a 6-inch hot roll (110° C.) for 4 minutes to prepare a modified butadiene polymer.

[Formula 2-1]

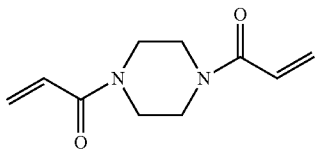

Meanwhile, the compound represented by Formula 2-1 was synthesized according to a method described in "Tetrahedron Letters, Vol. 43, Issue 51, 16 Dec. 2002, Pages 9417-9419" and used.

Example 2

A modified butadiene polymer was prepared by performing the same method in Example 1 except for using a compound represented by Formula 1-1 instead of the compound represented by Formula 2-1 as a modifier in Example 1.

[Formula 1-1]

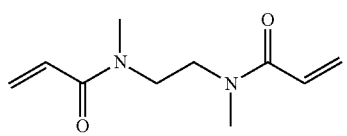

Meanwhile, the compound represented by Formula 1-1 was synthesized according to a method described in "The Journal of Organic Chemistry, Vol. 46, Issue 10, 1981, Pages 2182-2184" and used.

Example 3

A modified butadiene polymer was prepared by performing the same method in Example 1 except for using a compound represented by Formula 1-2 instead of the compound represented by Formula 2-1 as a modifier in Example 1.

[Formula 1-2]

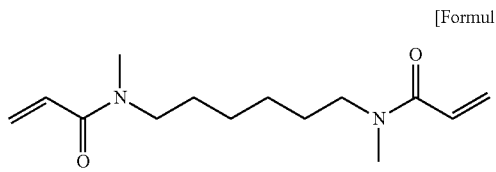

Meanwhile, the compound represented by Formula 1-2 was synthesized according to a method described in "European Journal of Medicinal Chemistry, Vol. 27, Issue 5, August 1992, Pages 463-477" and used.

Example 4

A modified butadiene polymer was prepared by performing the same method in Example 1 except for using a compound represented by Formula 1-3 instead of the compound represented by Formula 2-1 as a modifier in Example 1.

[Formula 1-3]

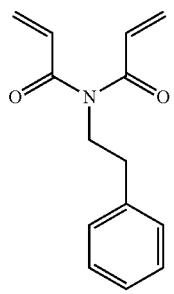

Meanwhile, the compound represented by Formula 1-3 was synthesized according to a method described in "Organic & Biomolecular Chemistry, Vol. 4, Issue 21, European Journal of Medicinal Chemistry, 2006, Vol. 27, Pages 3973-3979" and used.

Example 5

A modified butadiene polymer was prepared by performing the same method as in Example 1 except for performing the polymerization and modification reaction at 80° C. and using the compound represented by Formula 2-1 in 0.61 mmol as the modifier in Example 1.

Comparative Example 1

Under nitrogen conditions, 0.38 mmol of neodymium versatate (NdV), 3.7 mmol of diisobutylaluminum hydride (DIBAH), 0.96 mmol of diethylaluminum chloride and 13.2 mmol of 1,3-butadiene were added to hexane and mixed to prepare a catalyst composition.

To a completely dried 10 L, steel reactor, under a nitrogen atmosphere, 2.7 kg of hexane and 300 g of 1,3-butadiene were injected, and the temperature was elevated to 60° C. The catalyst composition was injected thereto, and polymerization reaction was performed for 60 minutes into prepare a butadiene polymer solution including an activated aluminum part at a terminal. In this case, the conversion ratio of 1,3-butadiene into polybutadiene was about 100%. 0.2 parts by weight of hexane in which polyoxyethylene glycol phosphate was dissolved as a polymerization quencher (based on 100 parts by weight of a polymer in the reactor) and 0.5 parts by weight of 2,6-di-t-butyl-p-cresol (based on 100 parts by weight of a polymer in the reactor) as an antioxidant were added thereto, and the reaction was finished. Then, solvents were removed through steam stripping, and drying was performed using a 6-inch hot roll (110° C.) for 4 minutes to prepare an unmodified butadiene polymer.

Comparative Example 2

A modified butadiene polymer was prepared by performing the same method in Example 1 except for using a compound represented by Formula 4 instead of the compound represented by Formula 2-1 as a modifier in Example 1.

[Formula 4]

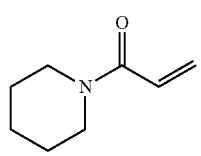

Meanwhile, the compound represented by Formula 4 was synthesized according to a method described in "Chemical Communications, Vol. 49, Issue 5, 2013, Pages 517-519" and used.

Experimental Example 1

With respect to the modified or unmodified butadiene polymers prepared in the Examples and the Comparative Examples, physical properties were measured according to the methods below, and the results are shown in Table 1 below.

1) Microstructure Analysis

The cis-1,4 bond content, the trans-1,4 bond content, and the vinyl bond content in each polymer were measured using Varian VNMRS 500 MHz NMR, and 1,1,2,2-tetrachloroethane D2 (Cambridge Isotope Co.) was used as a solvent.

2) Weight Average Molecular Weight (Mw), Number Average Molecular Weight (Mn) and Molecular Weight Distribution (MWD)

Each polymer was sufficiently dissolved in tetrahydrofuran (THF) for 2 hours or more under 40° C. conditions, and the resultant solution was loaded on gel permeation chromatography (GPC) and flown. In this case, two columns of PLgel Olexis™ and one column of PLgel MIXED-C™ (trade name, Polymer Laboratories Co.) were used in combination. Also, newly replaced columns were all mixed bed type columns, and polystyrene was used as a gel permeation chromatography standard material.

3) Mooney Viscosity and −S/R Value

The mooney viscosity (ML1+4, @100° C.) (MU) was measured before and after modification by using MV2000E of Monsanto Co. using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated, and the mooney viscosity was measured while applying torque. In addition, a −S/R value (absolute value) was determined by observing mooney viscosity change appearing during releasing the torque for 1 minute, and from the gradient value thereof.

Through the change, it could be confirmed that the degree of branching of a polymer chain was controlled through the modification using the modifier represented by Formula 1, as suggested in the present invention.

In addition, Examples 1 to 5 showed markedly increased mooney viscosity and at the same time, markedly decreased −S/R value even when compared with the modified butadiene polymer of Comparative Example 2, prepared by modifying with the compound represented by Formula 4 which included an acrylic group and a tertiary amine group, and through this, it could be found that the modifier represented by Formula 1 according to the present invention is even further effective for controlling the degree of branching of a polymer.

Experimental Example 2

Rubber compositions and rubber specimens were prepared using the polymers prepared in the Examples and the Comparative Examples, and then, tensile strength, 300% modulus and viscoelasticity properties (rotation resistance) were measured, respectively, according to the methods below, and the results are shown in Table 2 below.

1) Examples 1 to 5, Comparative Example 1 and Comparative Example 2

With 100 parts by weight of each polymer of Examples 1 to 5, and Comparative Examples 1 and 2, 70 parts by weight

TABLE 1

| | | Example | | | | | Comparative Example | |
|---|---|---|---|---|---|---|---|---|
| Division | | 1 | 2 | 3 | 4 | 5 | 1 | 2 |
| Microstructure (cis-1,4:vinyl:trans-1,4) | | 97.1: 0.5:2.4 | 97.2: 0.5:2.3 | 97.1: 0.5:2.4 | 97.2: 0.5:2.3 | 97.1: 0.6:2.3 | 97.1: 0.5:2.4 | 97.1: 0.5:2.4 |
| GPC results | Mn ($\times 10^5$ g/mol) | 2.64 | 2.75 | 2.68 | 2.73 | 2.57 | 1.55 | 1.56 |
| | Mw ($\times 10^5$ g/mol) | 6.90 | 7.59 | 7.13 | 7.23 | 10.77 | 3.46 | 3.36 |
| | MWD (Mw/Mn) | 2.61 | 2.76 | 2.66 | 2.65 | 4.20 | 2.23 | 2.15 |
| Mooney viscosity (RP) | Before modification | 27.3 | 31.4 | 28.4 | 30.4 | 44.8 | 30.5 | 30.5 |
| | After modification | 70.1 | 71.8 | 69.8 | 66.8 | 60.4 | — | 34.9 |
| | Mooney viscosity difference | 42.8 | 40.4 | 41.4 | 36.4 | 15.6 | — | 4.4 |
| | Mooney viscosity increasing ratio (%) | 156.8 | 128.7 | 145.7 | 119.7 | 34.8 | — | 14.4 |
| −S/R | Before modification | 1.1788 | 1.1422 | 1.1307 | 1.1523 | 0.8404 | 1.0401 | 1.1310 |
| | After modification | 0.4400 | 0.4708 | 0.4519 | 0.4689 | 0.2273 | — | 0.9969 |

Meanwhile, the mooney viscosity increasing ratio is a value calculated from (mooney viscosity difference/mooney viscosity before modification)×100.

As shown in Table 1 above, Example 1 to Example 5 according to embodiments of the present invention showed the mooney viscosity change ratio before and after modification of 30% or more, and the −S/R value after modification of 0.5 or less, and it could be confirmed that the mooney viscosity was significantly increased and at the same time, −S/R value was significantly decreased when compared with Comparative Example 1 which corresponds to an unmodified butadiene polymer.

of carbon black, 22.5 parts by weight of a process oil, 2 parts by weight of an antiaging agent (TMDQ), 3 parts by weight of zinc white (ZnO), and 2 parts by weight of stearic acid were compounded to prepare each rubber composition. Then, to each rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes at 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

2) Comparative Example 3

With 100 parts by weight of the polymer of Comparative Example 1, 70 parts by weight of carbon black, 0.123 parts by weight of the compound represented by Formula 2-1, 22.5 parts by weight of a process oil, 2 parts by weight of an antiaging agent (TMDQ), 3 parts by weight of zinc white (ZnO), and 2 parts by weight of stearic acid were compounded to prepare a rubber composition. Then, to the rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes at 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

3) Comparative Example 4

A vulcanized compounding product was obtained by the same method as Comparative Example 3 except for using 0.145 parts by weight of the compound represented by Formula 1-3 instead of the compound represented by Formula 2-1 in the above 2) Comparative Example 3, and a rubber specimen was manufactured through vulcanization.

4) Tensile Strength (kg·f/cm$^2$), 300% Modulus (kg·f/cm$^2$) and Elongation Rate The tensile strength, modulus when elongated by 300% (M-300%) and elongation rate when breaking the rubber specimens were measured according to the standard method of ASTM D412.

5) Viscoelasticity Properties

Tan δ properties, that are the major factors of low fuel consumption properties were measured by performing temperature sweep test at a frequency of 10 Hz, and dynamic strain of 3% with the temperature elevating rate of 2° C./min at −40° C. to +80° C., by using an EPLEXOR 500N DMTS (Dynamic mechanical thermo-spectrometer) equipment of Gabo Co. in Germany, and viscoelasticity coefficients (Tan δ) at 0° C. and 60° C. were measured. In this case, with the increase of the Tan δ value at 0° C., wet skid resistance was excellent, and with the decrease of the Tan δ value at 60° C., hysteresis loss was decreased, rolling resistance was low, and fuel performance was excellent. The resultant values in Table 2 were indexed based on the resultant value of Comparative Example 1, and thus, the higher numerical value means better results.

6) Processability Properties

The mooney viscosity (MV, (ML1+4, @100° C.) MU) of the vulcanized compounding products obtained in the 1) to 3) above was measured, a difference between the mooney viscosity of the vulcanized compounding product (FMB, final master batch) and the mooney viscosity of a polymer included in each compounding product (RP) was calculated, and processability properties were analyzed. In this case, if the mooney viscosity difference (absolute value) was decreased, the processability properties became better, and in Examples 1 to 5, and Comparative Example 2, the mooney viscosity after modification was considered as the mooney viscosity of a polymer.

For each vulcanized compounding product, the mooney viscosity (ML1+4, @100° C.) (MU) was measured by using MV2000E of Alpha Technologies Co. using Large Rotor at a rotor speed of 2±0.02 rpm at 100° C. before and after modification. In this case, a specimen used was stood at room temperature (23±3° C.) for 30 minutes or more, and 27±3 g of the specimen was collected and put in a die cavity, and then, Platen was operated, and the mooney viscosity was measured while applying torque.

7) Abrasion Resistance (DIN Abrasion Test)

For each rubber specimen, DIN abrasion test was performed based on ASTM D5963, and DIN weight loss index (loss volume index): abrasion resistance index (ARIA, method A) was shown.

TABLE 2

| Division | | Example (Index, %) | | | | | Comparative Example (Index, %) | | | |
|---|---|---|---|---|---|---|---|---|---|---|
| | | 1 | 2 | 3 | 4 | 5 | 1 | 2 | 3 | 4 |
| Tensile properties | M-300% | 104 | 103 | 104 | 106 | 104 | 100 | 97 | 100 | 103 |
| | Tensile strength | 110 | 113 | 112 | 112 | 105 | 100 | 99 | 101 | 102 |
| | Elongation rate | 105 | 104 | 106 | 102 | 103 | 100 | 101 | 101 | 94 |
| Viscoelasticity properties | Tan δ at 0° C. | 100 | 99 | 100 | 99 | 103 | 100 | 98 | 100 | 98 |
| | Tan δ at 60° C. | 105 | 108 | 107 | 104 | 102 | 100 | 97 | 99 | 101 |
| Processability properties | FMB MV | 83 | 89 | 82 | 85 | 56 | 58 | 71 | 60 | 64 |
| | Mooney viscosity difference | 13 | 17 | 12 | 18 | −4 | 27 | 36 | 29 | 33 |
| Abrasion resistance | DIN | 106 | 102 | 107 | 104 | 111 | 100 | 96 | 100 | 98 |

In Table 2 above, the tensile properties, abrasion resistance and Tan δ value at 0° C. of Examples 1 to 5, and Comparative Examples 2 to 4 were indexed based on the measurement values of Comparative Example 1 and calculated by Mathematical Formula 2 below, and Tan δ value at 60° C. was calculated by Mathematical Formula 3 below and indexed.

Index=(measured value)×100 / standard value) [Mathematical Formula 2]

Index=(standard value)×100 / measured value) [Mathematical Formula 3]

As shown in Table 2 above, Examples 1 to 5 according to embodiments of the present invention showed improved tensile properties and viscoelasticity properties, and markedly improved effects of processability properties and abrasion resistance in contrast to Comparative Examples 1 to 4.

Particularly, Examples 1 to 5 showed equivalent or better 300% modulus, markedly increased tensile strength, elongation rate and viscoelasticity properties, markedly improved processability properties, and largely improved abrasion resistance by about 6% to 15% when compared with the modified butadiene polymer of Comparative Example 2, which was prepared using a modifier different from the modifier suggested in the present invention.

In addition, in Comparative Examples 3 and 4 using the modifiers suggested in the present invention during preparing rubber compositions, tensile properties and viscoelasticity properties were markedly deteriorated, and processability properties and abrasion resistance were rapidly reduced when compared with Example 1 and Example 4, including the same modifiers, respectively.

From the results, it could be confirmed that the modified conjugated diene-based polymer according to the present invention was prepared through modification reaction using the modifier represented by Formula 1, and the degree of branching was controlled, processability properties and abrasion resistance were markedly improved, and at the same time, by including a functional group derived from the modifier in a polymer chain, affinity with a filler may be excellent, and thus, tensile properties and viscoelasticity properties may also be excellent.

In addition, the effects are shown because the modifier is bonded to the polymer chain to influence the degree of branching and properties of the polymer, and it could be confirmed that in case of applying the modifier during compounding the rubber composition as in Comparative Example 3 and Comparative Example 4, the effects were not shown.

The invention claimed is:

1. A modified conjugated diene-based polymer comprising:
   a unit derived from a conjugated diene-based monomer; and
   a functional group derived from a modifier represented by Formula 1:

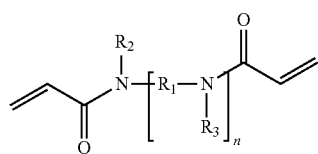

[Formula 1]

in Formula 1,
$R_1$ is an alkylene group of 1 to 20 carbon atoms, an alkenylene group of 2 to 20 carbon atoms, an alkynylene group of 2 to 20 caron atoms, a cycloalkylene group of 3 to 20 carbon atoms, an arylene group of 6 to 20 carbon atoms, a heteroalkylene group of 1 to 20 carbon atoms, a heteroalkenylene group of 2 to 20 carbon atoms, a heteroalkynylene group of 2 to 20 carbon atoms, a heterocycloalkylene group of 3 to 20 carbon atoms or a heteroarylene group of 3 to 20 carbon atoms, each of which is optionally substituted with a substituent, $R_2$ and $R_3$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an aralkyl group of 7 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 3 to 20 carbon atoms, or a heteroaryl group of 3 to 20 carbon atoms, each of which is optionally substituted with the substituent, or $R_2$ and $R_3$ are connected with each other, and together with $R_1$ and N to form a heterocyclic group of 3 to 20 carbon atoms, which is optionally substituted with the substituent, where the substituent is an alkyl group of 1 to 10 carbon atoms, an alkenyl group of 2 to 10 carbon atoms, an alkynyl group of 2 to 10 carbon atoms, a cycloalkyl group of 3 to 10 carbon atoms or an aryl group of 6 to 10 carbon atoms, and n is 0 or 1, wherein the functional group derived from the modifier is bonded to at least one terminal of a polymer chain comprised of the unit derived from the conjugated diene-based monomer.

2. The modified conjugated diene-based polymer of claim 1, wherein
in Formula 1,
n is 1,
$R_1$ is an alkylene group of 1 to 10 carbon atoms, an alkenylene group of 2 to 10 carbon atoms, an alkynylene group of 2 to 10 caron atoms, a heteroalkylene group of 1 to 10 carbon atoms, a heteroalkenylene group of 2 to 10 carbon atoms, a heteroalkynylene group of 2 to 10 carbon atoms, a heterocycloalkylene group of 3 to 10 carbon atoms or heteroarylene group of 3 to 10 carbon atoms, each of which is optionally substituted with a substituent, $R_2$ and $R_3$ are each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 6 to 10 carbon atoms, each of which is optionally substituted with the substituent, or $R_2$ and $R_3$ are connected with each other, and together with $R_1$ and N to form a heterocyclic group of 3 to 10 carbon atoms, which is optionally substituted with the substituent, and the substituent is an alkyl group of 1 to 6 carbon atoms, an alkenyl group of 2 to 6 carbon atoms, an alkynyl group of 2 to 6 carbon atoms, a cycloalkyl group of 3 to 6 carbon atoms or an aryl group of 6 to 8 carbon atoms.

3. The modified conjugated diene-based polymer of claim 1, wherein the modifier is represented by Formula 1-1, Formula 1-2 or Formula 1-3:

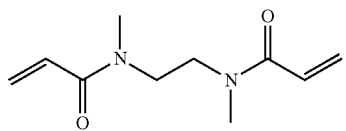
[Formula 1-1]

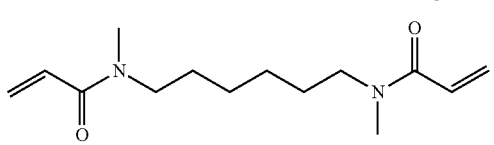
[Formula 1-2]

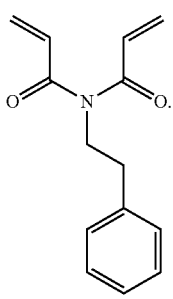
[Formula 1-3]

4. The modified conjugated diene-based polymer of claim 1,
wherein the modifier is represented by Formula 2:

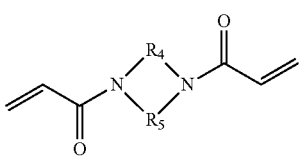
[Formula 2]

in Formula 2,
$R_4$ and $R_5$ are each independently an alkylene group of 1 to 3 carbon atoms, an alkenylene group of 2 to 4 carbon atoms or an alkynylene group of 2 to 4 carbon atoms, each of which is optionally substituted with a substituent, wherein the substituent is an alkyl group of 1 to 3 carbon atoms, an alkenyl group of 2 to 4 carbon atoms, an alkynyl group of 2 to 4 carbon atoms, a cycloalkyl group of 3 to 6 carbon atoms or an aryl group of 6 to 10 carbon atoms.

5. The modified conjugated diene-based polymer of claim 3, wherein the modifier is represented by Formula 2-1:

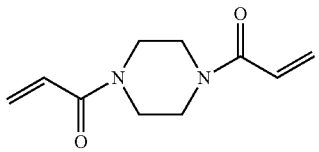
[Formula 2-1]

6. The modified conjugated diene-based polymer of claim 1, which has a molecular weight distribution of 1.5 to 10.0.

7. The modified conjugated diene-based polymer of claim 1, which has a-S/R value measured at 100° C. of 0.5 or less, and a mooney viscosity of 40 or more.

8. The modified conjugated diene-based polymer of claim 1, which has a 1,4-cis bond content measured by a Fourier-transform infrared spectroscopy of 95 wt % or more, and a vinyl bond content of 5 wt % or less.

9. The modified conjugated diene-based polymer of claim 1, which is a neodymium catalyzed modified conjugated diene-based polymer.

10. The modified conjugated diene-based polymer of claim 1, wherein the conjugated diene-based monomer is at least one selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene.

11. A modified conjugated diene-based polymer claim comprising:
a unit derived from a conjugated diene-based monomer; and
a functional group derived from a modifier represented by Formula 1:

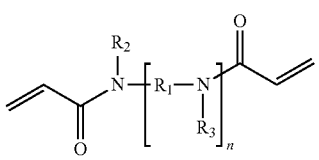
[Formula 1]

wherein
in Formula 1,
n is 0,
$R_1$ and $R_3$ are not present,
$R_2$ is an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, an aralkyl group of 7 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 6 to 10 carbon atoms, each of which is optionally substituted with a substituent.

12. The modified conjugated diene-based polymer of claim 11, wherein the modifier is represented by Formula 1-3:

[Formula 1-3]

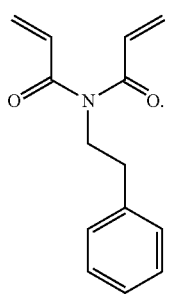

13. A method for preparing the modified conjugated diene-based polymer of claim 1, the method comprising:
polymerizing the conjugated diene-based monomer in the presence of a neodymium catalyst composition in a hydrocarbon-based solvent to prepare an active polymer; and
reacting the active polymer with the modifier represented by Formula 1.

14. The method for preparing the modified conjugated diene-based polymer of claim 13, wherein the modifier is represented by Formula 1-1, Formula 1-2, Formula 1-3 or Formula 2-1:

[Formula 1-1]

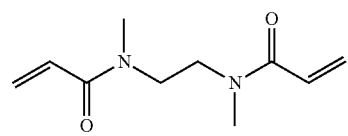

[Formula 1-2]

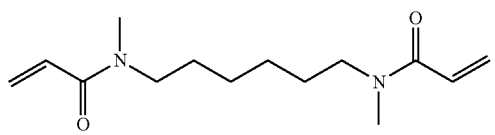

[Formula 1-3]

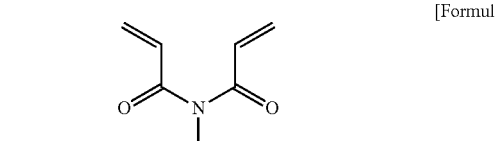

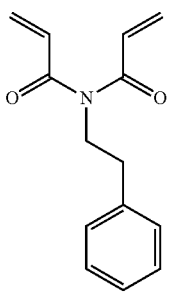

[Formula 2-1]

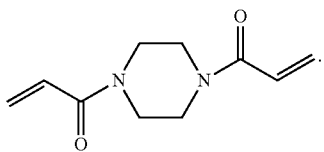

15. The method for preparing the modified conjugated diene-based polymer of claim 13, wherein the neodymium catalyst composition comprises a neodymium compound, an alkylating agent and a halogen compound, and
the neodymium compound is represented by Formula 3:

[Formula 3]

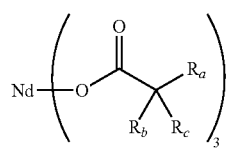

in Formula 3,
$R_a$ to $R_c$ are each independently hydrogen or an alkyl group of 1 to 12 carbon atoms,
where $R_a$ to $R_c$ are not both hydrogen.

16. The method for preparing the modified conjugated diene-based polymer of claim 13, wherein the active polymer includes an organometal part at the terminal, and the organometal part is activated from the neodymium catalyst composition.

17. A rubber composition comprising: the modified conjugated diene-based polymer of claim 1; and a filler.

18. The rubber composition of claim 17, which satisfies Mathematical Formula 1:

$$-15 \leq X-Y \leq 20 \quad \text{[Mathematical Formula 1]}$$

in Mathematical Formula 1,
X is a mooney viscosity of the rubber composition measured at 100° C., and Y is a mooney viscosity of the modified conjugated diene-based polymer measured at 100° C.

* * * * *